US012175841B2

(12) United States Patent
Mirjavadi et al.

(10) Patent No.: US 12,175,841 B2
(45) **Date of Patent: *Dec. 24, 2024**

(54) BONUS ROUND FOR VIDEO KENO GAME

(71) Applicant: Aristocrat Technologies, Inc., Las Vegas, NV (US)

(72) Inventors: Daniel Mirjavadi, Las Vegas, NV (US); John Daley, Las Vegas, NV (US); Christopher Brune, Carson City, NV (US); David Kaminkow, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 21 days.

This patent is subject to a terminal disclaimer.

(21) Appl. No.: 18/204,137

(22) Filed: May 31, 2023

(65) Prior Publication Data

US 2023/0306822 A1 Sep. 28, 2023

Related U.S. Application Data

(63) Continuation of application No. 17/994,827, filed on Nov. 28, 2022, now Pat. No. 11,704,978, and a (Continued)

(51) Int. Cl.
*G07F 17/32* (2006.01)

(52) U.S. Cl.
CPC ........ *G07F 17/329* (2013.01); *G07F 17/3267* (2013.01)

(58) Field of Classification Search
CPC .... G07F 17/32; G07F 17/3213; G07F 17/329; G07F 17/3244; G07F 17/326;
(Continued)

(56) References Cited

U.S. PATENT DOCUMENTS 5,833,537 A * 11/1998 Barrie ................ G07F 17/3265 D21/370
6,183,361 B1 2/2001 Cummings
(Continued)

OTHER PUBLICATIONS

Office Action dated Aug. 24, 2022 for U.S. Appl. No. 17/201,197 (pp. 1-9).

(Continued)

*Primary Examiner* — Milap Shah
(74) *Attorney, Agent, or Firm* — Brownstein Hyatt Farber Schreck, LLP

(57) ABSTRACT

A bonus round of a video keno game may consist of a series of bonus game instances. During a bonus game instance, a game controller may identify a set of bonus game pieces and select a set of bonus outcome identifiers from a bonus outcome pool. A win amount may be determined based on the number of matches between the set of bonus outcome identifiers and the set of bonus game pieces. The bonus outcome identifiers may include persistent identifiers and non-persistent identifiers. Persistent identifiers may be removed from the bonus outcome pool for subsequent bonus game instances in the series. Additionally or alternatively, the bonus game pieces corresponding to the persistent identifiers may continue to be matches for the subsequent bonus game instances in the series.

20 Claims, 14 Drawing Sheets

Related U.S. Application Data continuation of application No. 17/201,197, filed on Mar. 15, 2021, now Pat. No. 11,532,214.

(58) Field of Classification Search
CPC ............ G07F 17/3262; G07F 17/3258; G07F 17/3267; G07F 17/34; A63F 3/00157; A63F 3/06; A63F 3/0645; G07C 15/001
See application file for complete search history.

(56) References Cited

U.S. PATENT DOCUMENTS

| | | | | |
|---|---|---|---|---|
| 6,743,102 | B1 | 6/2004 | Fiechter | |
| 9,741,205 | B2 | 8/2017 | Nguyen | |
| 10,002,496 | B2 | 6/2018 | Humphrey | |
| 11,532,214 | B2 | 12/2022 | Mirjavadi | |
| 11,704,978 | B2 * | 7/2023 | Mirjavadi | G07F 17/329 463/18 |
| 2003/0064772 | A1 | 4/2003 | Tempest | |
| 2005/0037832 | A1 | 2/2005 | Cannon | |
| 2008/0032782 | A1 | 2/2008 | Boesen | |
| 2008/0090634 | A1 | 4/2008 | Baerlocher | |
| 2011/0117995 | A1 | 5/2011 | Vallejo | |
| 2013/0137502 | A1 | 5/2013 | Boesen | |
| 2014/0080556 | A1 | 3/2014 | Knutsson | |
| 2016/0267741 | A1 | 9/2016 | Humphrey | |
| 2020/0074805 | A1 | 3/2020 | Selegue | |
| 2020/0242892 | A1 | 7/2020 | Luciano | |
| 2020/0380813 | A1 | 12/2020 | Luciano | |

OTHER PUBLICATIONS

Office Action (Notice of Allowance and Fees Due (PTOL-85)) dated Oct. 20, 2022 for U.S. Appl. No. 17/201,197 (pp. 1-5).
Office Action (Notice of Allowance and Fees Due (PTOL-85)) dated May 22, 2023 for U.S. Appl. No. 17/994,827 (pp. 1-5) .

* cited by examiner

BONUS ROUND FOR VIDEO KENO GAME

CROSS-REFERENCE TO RELATED APPLICATIONS

This application is a continuation of U.S. patent application Ser. No. 17/994,827, filed Nov. 28, 2022, which is a continuation of U.S. patent application Ser. No. 17/201,197, filed Mar. 15, 2021, now U.S. Pat. No. 11,532,214, the contents of which are incorporated herein by reference as if fully disclosed herein.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

The embodiments described herein may include a method for implementing a game on a gaming device. The method may include the step of instantiating a bonus game play user interface in accordance with a base game outcome presented in a base game play user interface. The bonus game play user interface may depict an array of game pieces. Each game piece of the array may depict an identifier corresponding to the game piece. The method may further include the steps of identifying a set of bonus game pieces from the array of game pieces and executing a series of bonus game instances. Executing each bonus game instance of the series may include selecting a set of bonus outcome identifiers from a bonus outcome pool. The set of bonus outcome identifiers may include one or more persistent identifiers and one or more non-persistent identifiers. Executing each bonus game instance of the series may further include determining a set of bonus matches comprising bonus game pieces having identifiers that match a bonus outcome identifier. Executing each bonus game instance of the series may further include determining a win amount based on a number of bonus game pieces in the set of bonus matches. Each persistent identifier of the set of bonus outcome identifiers may be removed from the bonus outcome pool for all subsequent bonus game instances of the series. Each bonus game piece in the set of bonus matches that corresponds to a persistent identifier of the set of bonus outcome identifiers may be maintained in the set of bonus matches for all subsequent bonus game instances of the series.

Further embodiments described herein may include a gaming system that includes a display and a game controller. The display may be configured to present a base game play user interface and a bonus game play user interface for a video keno game. The game controller may be configured to instantiate the bonus game play user interface in accordance with a base game outcome presented in the base game play user interface. The bonus game play user interface may depict an array of game pieces. Each game piece of the array may depict a number corresponding to the game piece. The game controller may be further configured to identify a set of bonus game pieces from the array of game pieces and execute a series of bonus game instances. Executing each bonus game instance of the series may include selecting one or more persistent numbers and one or more non-persistent numbers from a bonus outcome pool. Executing each bonus game instance of the series may further include determining a set of bonus matches comprising bonus game pieces having numbers that match the one or more persistent numbers or the one or more non-persistent numbers and determining a win amount based on a match number of bonus game pieces in the set of bonus matches. Each bonus game piece in the set of bonus matches that corresponds to a persistent number of the one or more persistent numbers may be maintained in the set of bonus matches for all subsequent bonus game instances of the series.

Still further embodiments described herein may include a method for implementing a video keno game. The method may include the step of instantiating a bonus game play user interface in accordance with a base game outcome presented in a base game play user interface. The bonus game play user interface may depict an array of game pieces. Each game piece of the array may depict an identifier corresponding to the game piece. The method may further include the step of providing, in the bonus game play user interface, a first visual indication on each of a set of game pieces from the array of game pieces. The first visual indication may indicate that each of the set of game pieces is a selected bonus game piece. The method may further include the step of executing a series of bonus game instances. Executing each bonus game instance of the series may include displaying, in the bonus game play user interface, a set of bonus outcome identifiers selected from a bonus outcome pool. The set of bonus outcome identifiers may include one or more persistent identifiers and one or more non-persistent identifiers. Executing each bonus game instance of the series may further include providing, in the bonus game play user interface, a second visual indication on each of a first subset of the set of game pieces from the array of game pieces. The second visual indication may indicate that each of the first subset of game pieces is a selected bonus game piece that corresponds to a persistent identifier of the set of bonus outcome identifiers. Executing each bonus game instance of the series may further include providing, in the bonus game play user interface, a third visual indication on each of a second subset of the set of game pieces from the array of game pieces. The third visual indication may indicate that each of the second subset of game pieces is a selected bonus game piece that corresponds to a non-persistent identifier of the set of bonus outcome identifiers. Executing each bonus game instance of the series may further include displaying, in the bonus game play user interface, a number of game pieces in a set of bonus game matches that includes the first subset and the second subset. Executing each bonus game instance of the series may further include displaying, in the bonus game play user interface, a win amount based on the number of game pieces in the set of bonus game matches. Each persistent identifier may be removed from the bonus outcome pool for all subsequent bonus game instances of the series. Each game piece in the first subset may be included in the set of bonus game matches for all subsequent bonus game instances of the series.

DETAILED DESCRIPTION

Gaming devices, such as those described herein, may be used to implement a video keno game or other game. The game may include a base game having an associated base game play user interface and a bonus round having an associated bonus game play user interface. During a base game instance, users may select a set of base game pieces, and the game controller may select a set of numbers (or other identifiers) from a pool that includes the identifiers of the selectable game pieces. Depending on the number of matches between the selected game pieces and the selected set of numbers, a win amount may be determined. Additionally, users may select a set of trigger game pieces. If a threshold number of trigger game pieces match the selected set of numbers, the game enters the bonus round.

The bonus round may consist of a series of bonus game instances. During a bonus game instance, the game controller may identify a set of bonus game pieces, which may be the same game pieces as the base game pieces selected for the base game or a different set of game pieces selected for the bonus game. The game controller may select a set of bonus outcome identifiers from a bonus outcome pool, and a win amount may be determined based on the number of matches between the set of bonus outcome identifiers and the set of bonus game pieces.

The bonus outcome identifiers may include persistent identifiers and non-persistent identifiers. Persistent identifiers may be removed from the bonus outcome pool for subsequent bonus game instances in the series. In some embodiments, the number of bonus outcome identifiers selected during each bonus game in the bonus round is constant, so removing the persistent identifiers from the bonus outcome pool increases the chances that other identifiers are selected from the bonus pool. Additionally or alternatively, the bonus game pieces corresponding to the persistent identifiers may continue to be matches for the subsequent bonus game instances in the series. This way, if a user gets a match from a persistent identifier, the match persists through each subsequent bonus game instance in the series.

Figure 1:
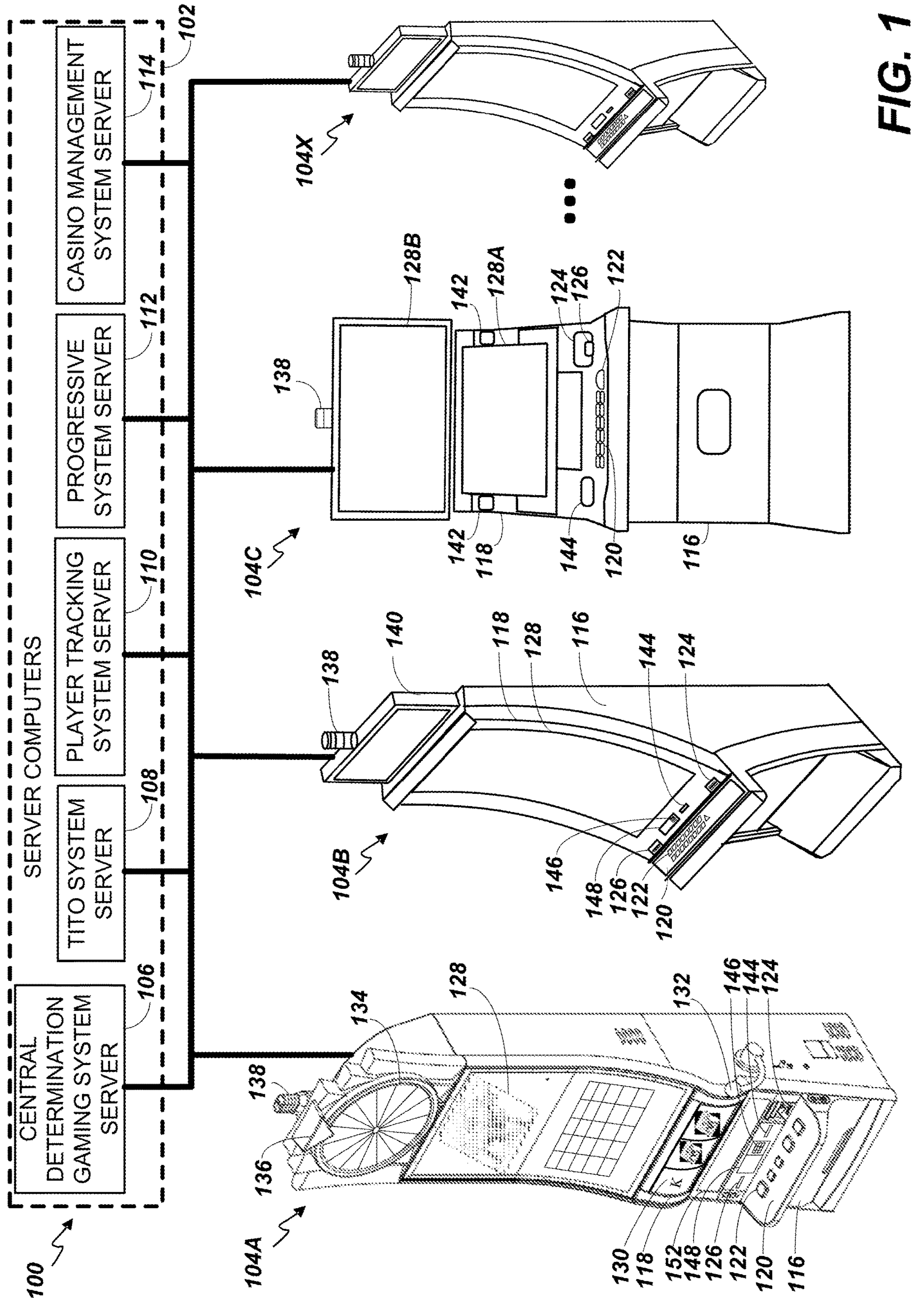
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
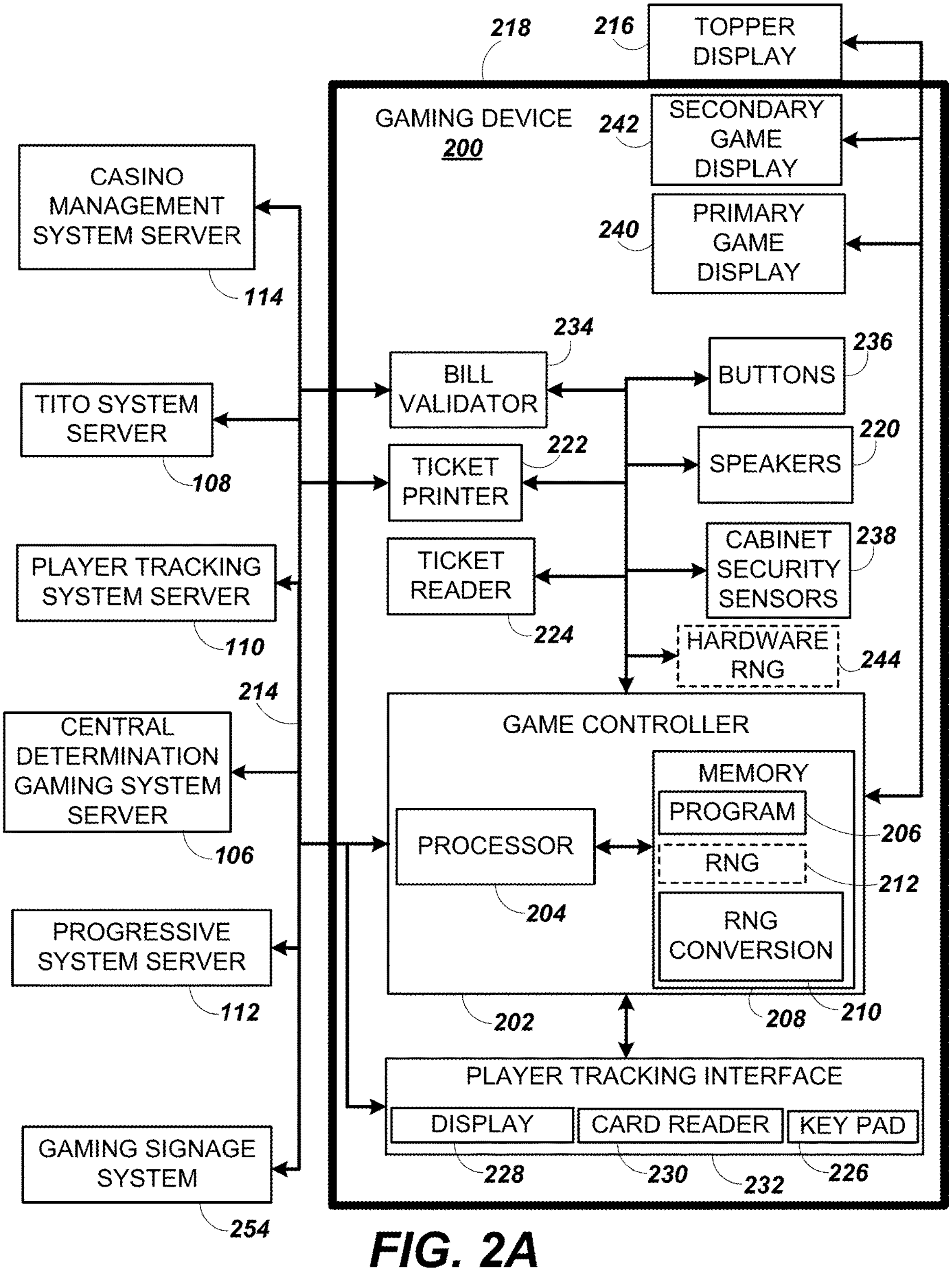
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
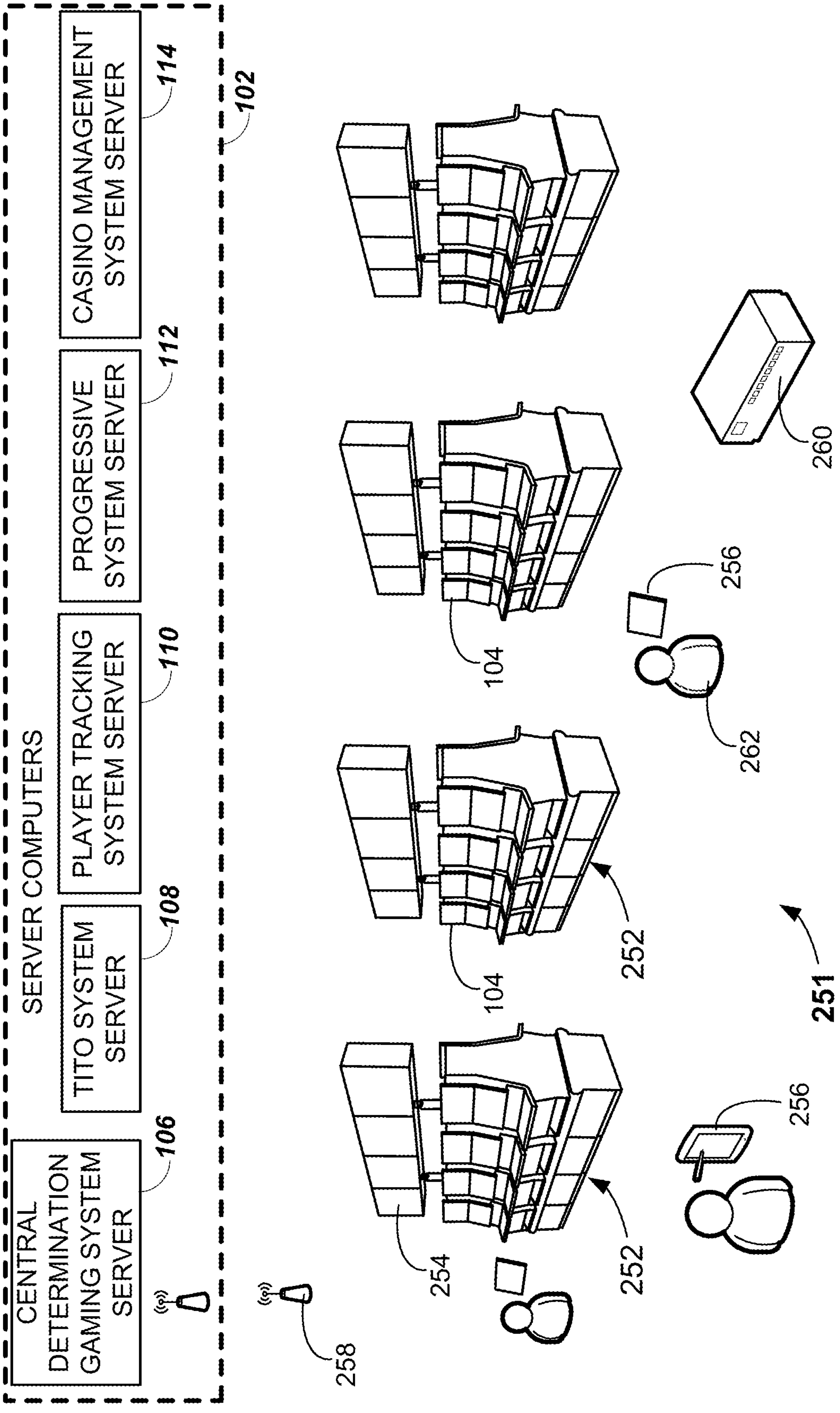
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
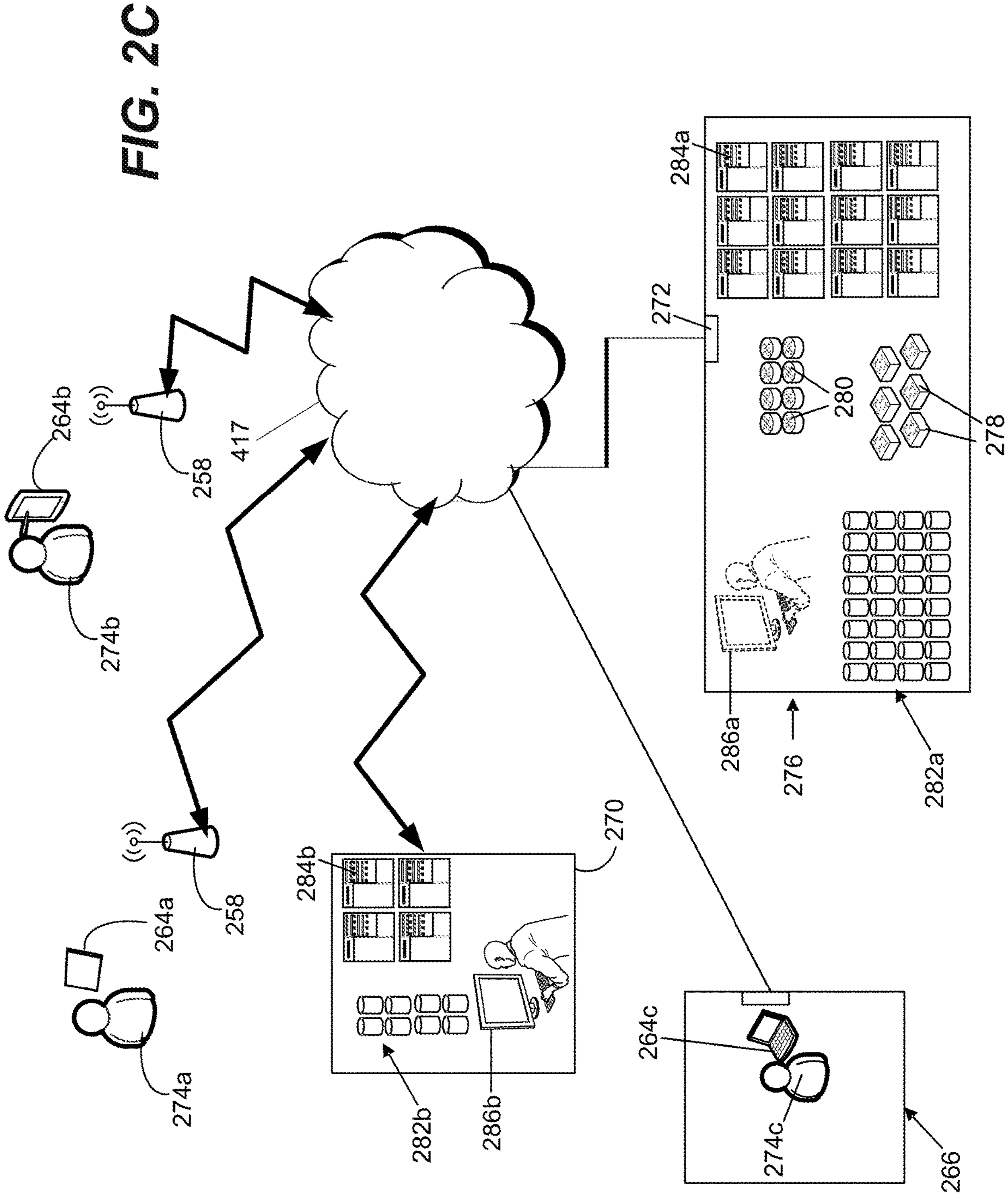
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
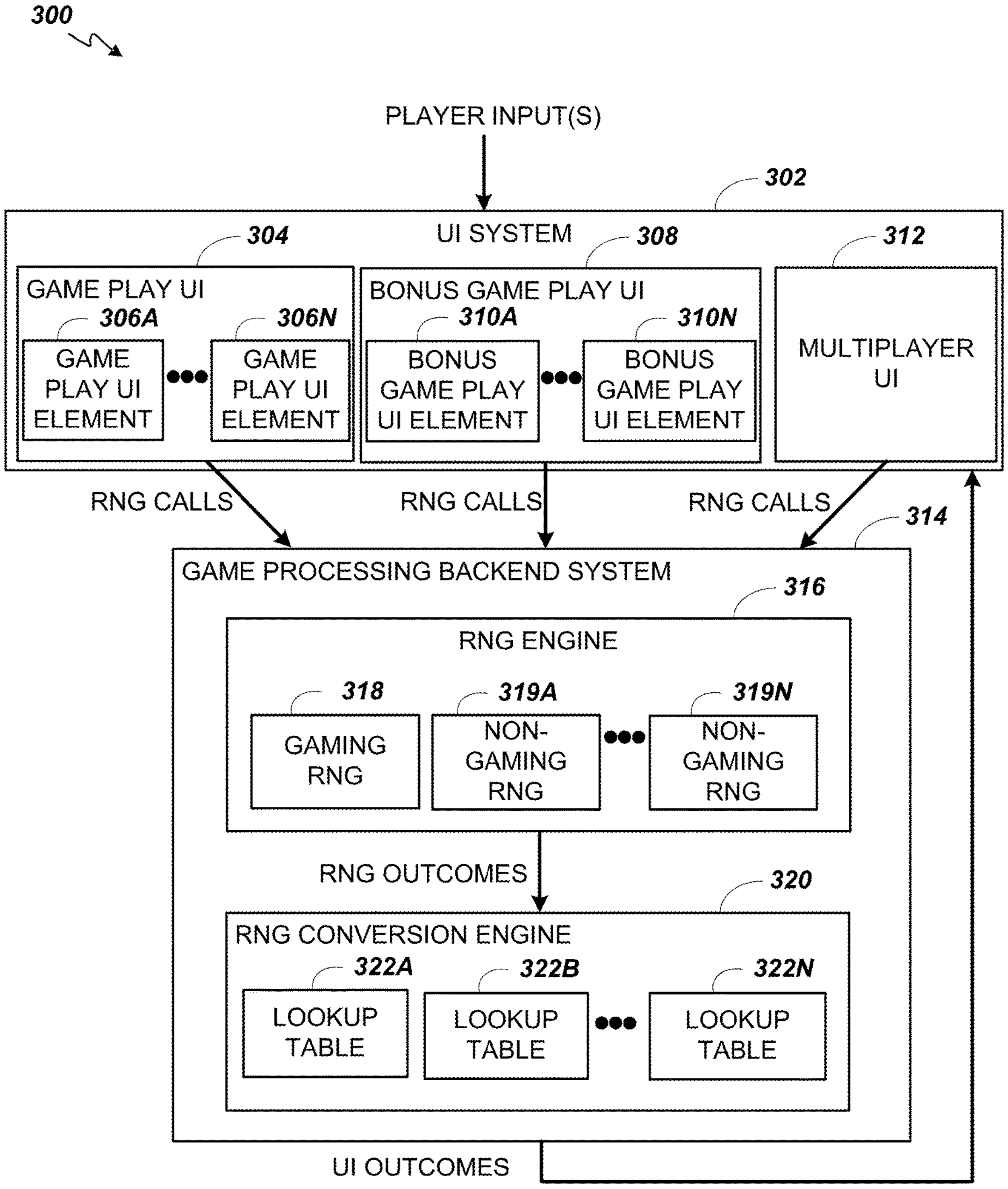
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N. An example game play UI is shown and described below with respect to FIGS. 4 and 5A-5C. An example bonus game play UI is shown and described below with respect to FIGS. 6 and 7A-7D.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
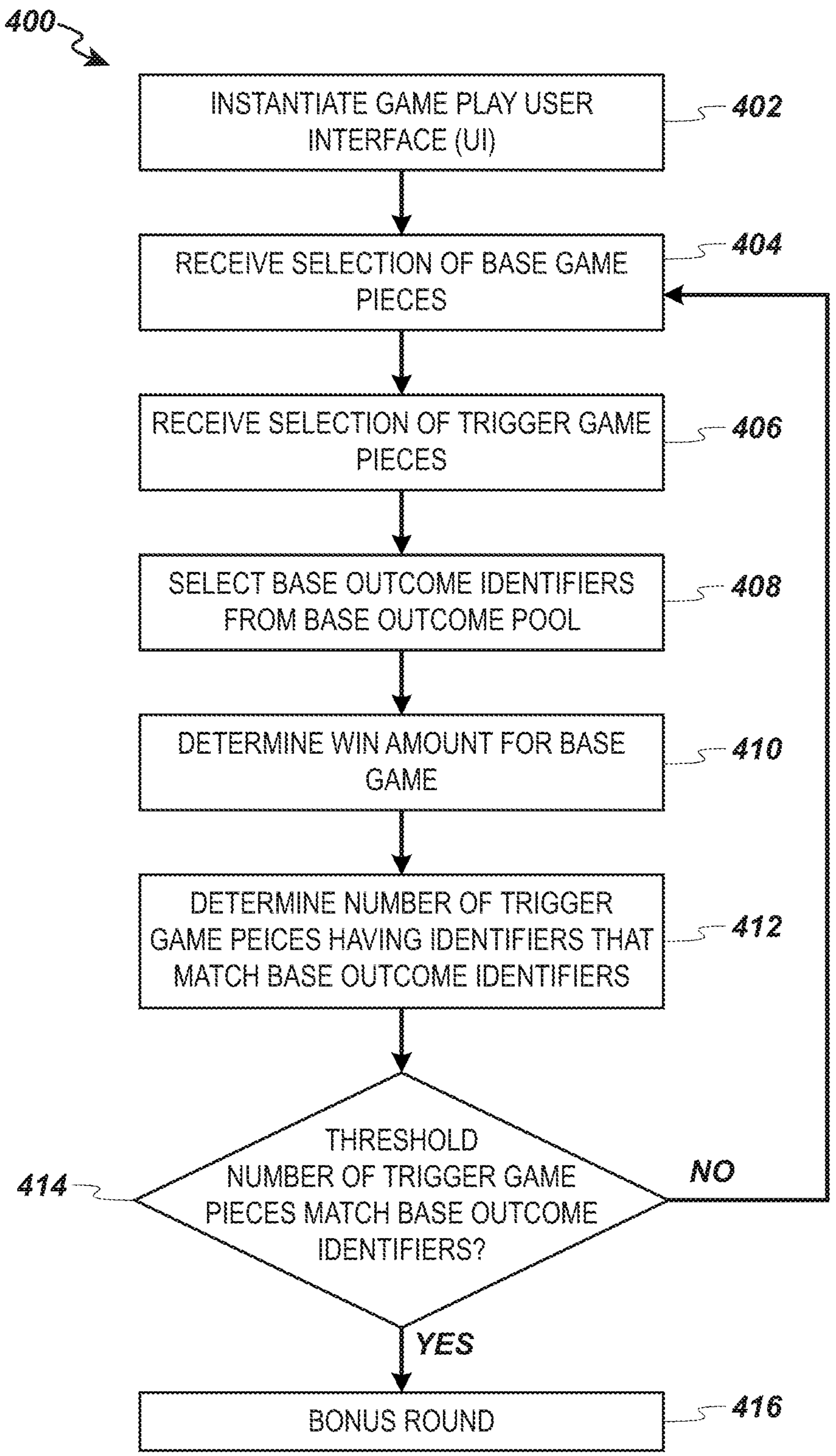
FIG. 4 is a flowchart depicting operations of an example method for implementing a base game of a video keno game or other game.
Figure 5A:
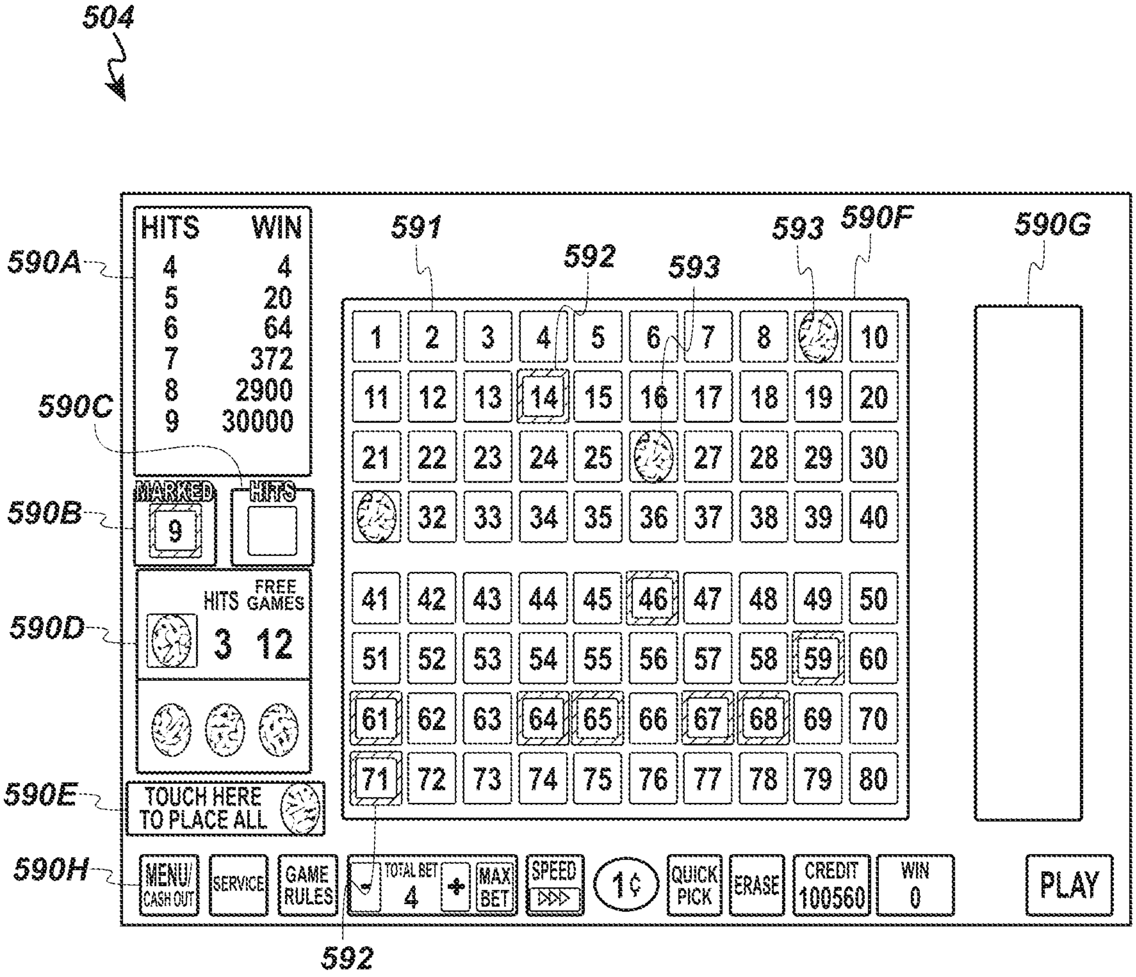
FIGS. 5A-5C illustrate an example game play user interface for the base game of the video keno game or other game.
Figure 5B:
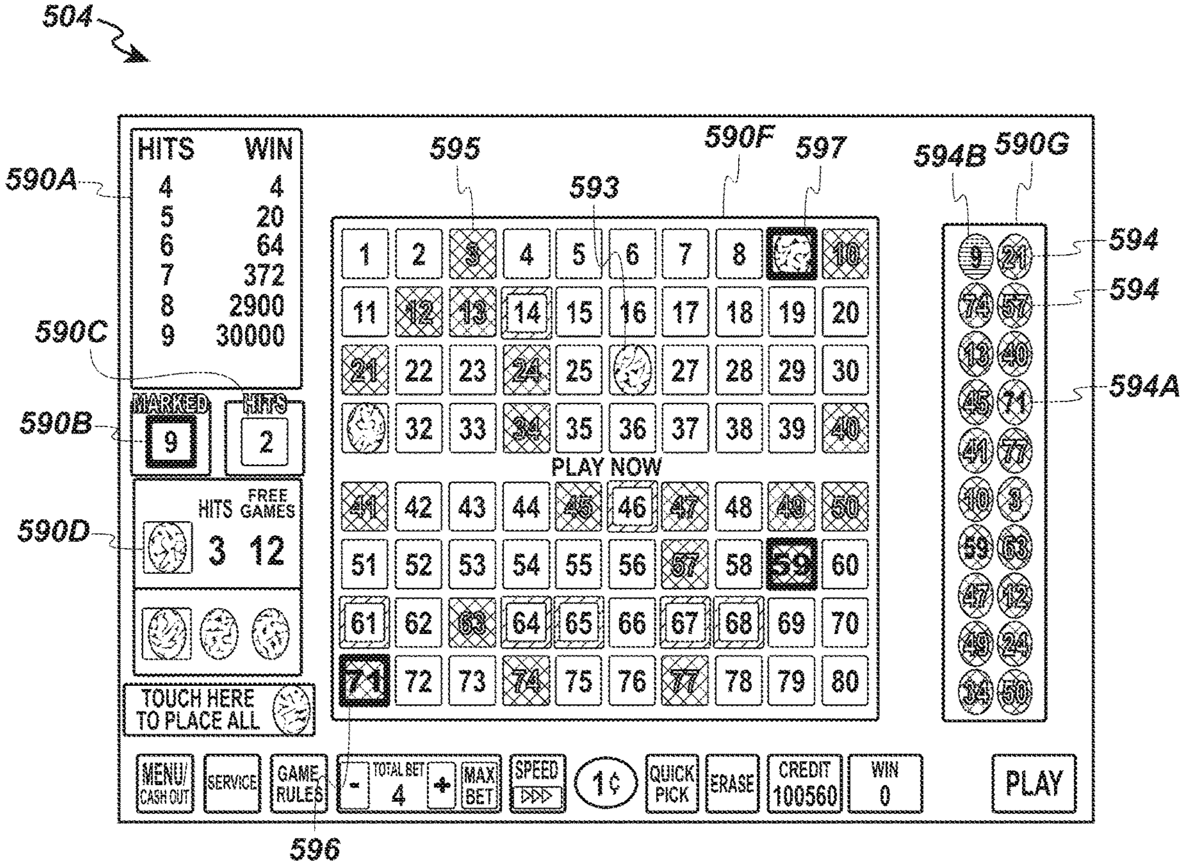
Figure 5C:
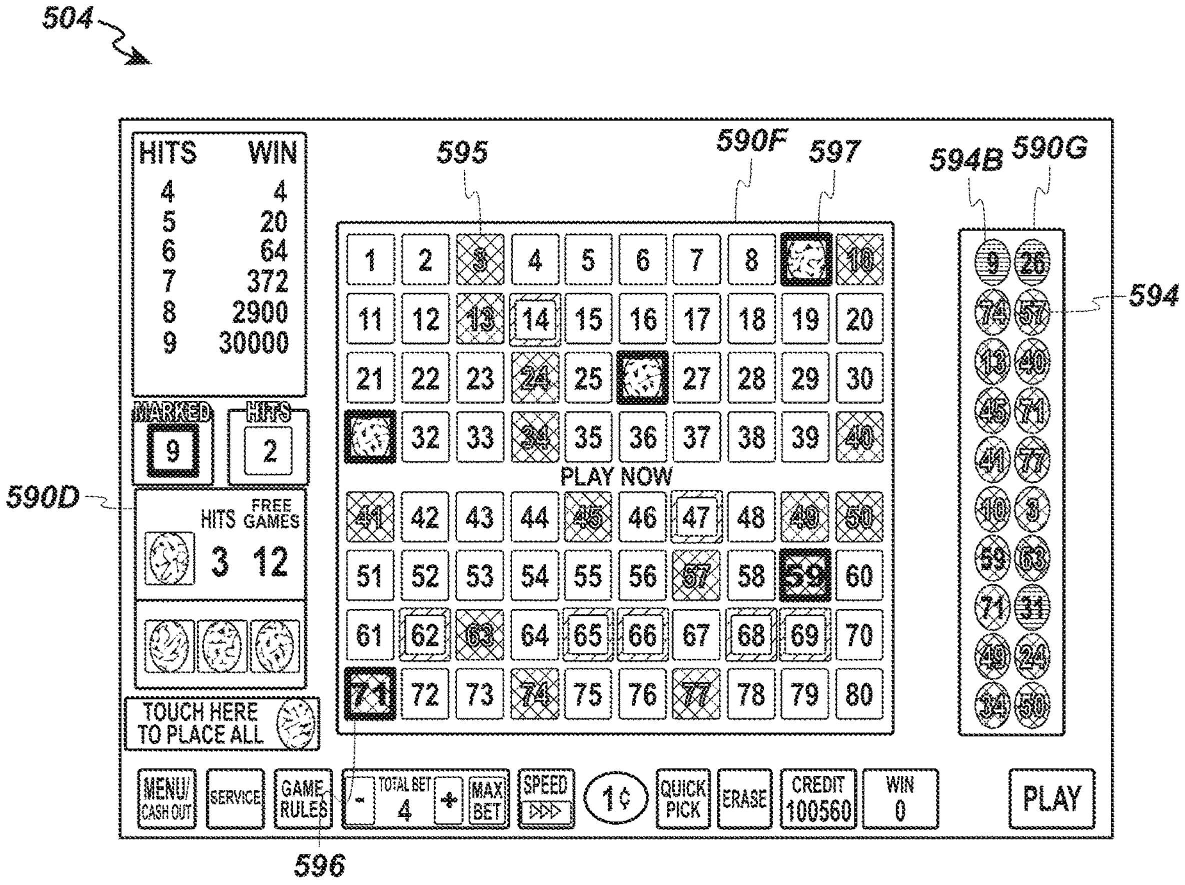

FIG. 4 is a flowchart depicting operations of an example method 400 for implementing a base game of a video keno game or other game. The operations of the method 400 may be performed by a game controller (e.g., game controller 202) according to game processing architecture (e.g., game processing architecture 300). FIGS. 5A-5C illustrate an example game play UI 504 for the base game of the video keno game or other game. The example game play UI 504 may be provided on a display of a gaming device (e.g., gaming devices 104A-104X and 200).

At operation 402, the game controller instantiates a game play UI (e.g., game play UI 504). As shown in FIG. 5A, the example game play UI 504 includes UI regions 590A-H. The UI regions 590A-H include UI elements (e.g., game play UI elements 306A-306N) to present information to a user of the game and/or receive user inputs. The UI regions 590A-H are discussed in more detail below.

The UI region 590F includes an array of selectable game pieces 591. Each game piece 591 depicts an identifier (e.g., a number, symbol, or the like) corresponding to the game piece. In the example shown in FIG. 5A, the identifiers are numbers from 1 to 80. In various embodiments, there may be any number of game pieces having any suitable identifiers.

As described in more detail below, during a base game instance, users may select a set of base game pieces, and the game controller may select a set of numbers (or other identifiers) from a pool that includes the identifiers of the selectable game pieces. Depending on the number of matches between the selected game pieces and the selected set of numbers, a win amount may be determined. Additionally, users may select a set of trigger game pieces. If a threshold number of trigger game pieces match the selected set of numbers, the game enters a bonus round, as described in more detail below with respect to FIGS. 6 and 7A-7D.

Returning to FIG. 4, at operation 404, the game controller receives a selection of one or more base game pieces. As shown in FIG. 5A, the selected base game pieces 592 may be game pieces 591 that are selected by user input (e.g., by a user touching or otherwise selecting the game piece). In some cases, the base game pieces 592 may be selected automatically, for example using the quick pick UI element in UI region 590H. The game play UI 504 may include a visual indication that a game piece is a selected base game piece 592. For example, the selected base game pieces 592 may include a different pattern, color, shading, or other features (e.g., a border or an icon) compared to other game pieces. As an example shown in FIG. 5A, the selected base game pieces 592 may include a highlighted border and a different-colored number. The UI region 590B may indicate a number of selected ("marked") base game pieces 592. In this non-limiting example, nine selected base game pieces 592 are indicated in UI region 590F and UI region 590B.

Returning to FIG. 4, at operation 406, the game controller receives a selection of trigger game pieces 593. As shown in FIG. 5A, the trigger game pieces 593 may be game pieces 591 that are selected by user input. As an example, a user may touch or otherwise select the UI element in UI region 590E and then touch or otherwise select the trigger game pieces 593 in UI region 590F. In some cases, the trigger game pieces 593 may be selected automatically, for example using the quick pick UI element in UI region 590H. The game play UI 504 may include a visual indication that a game piece is a trigger game piece 593. For example, the trigger game pieces 593 may include a different pattern, color, shading, or other features (e.g., a border or an icon) compared to other game pieces. As an example shown in FIG. 5A, the trigger game pieces 593 may include an icon indicating they are selected as bonus game pieces. The UI region 590D may provide information regarding the trigger game pieces 593. For example, the UI region 590D may indicate a number of selected trigger game pieces 593 and/or the threshold number of matching trigger game pieces required to enter the bonus round. In this non-limiting example, three trigger game pieces 593 have been selected as indicated in UI region 590F.

Returning to FIG. 4, at operation 408, the game controller selects a set of base outcome identifiers from a base outcome pool. As noted above, the base outcome pool may consist of identifiers that match the identifiers of the selectable game pieces 591. In some cases, the base outcome pool may have equal numbers of each identifier such that selection of any particular identifier as a base outcome identifier is equally likely as selection of any other identifier.

The set of base outcome identifiers may be determined using a random number generator, as discussed in more detail above with respect to FIG. 3. In some cases, the game controller selects the set of base outcome identifiers in response to a user selecting the 'PLAY' UI element of the UI region 590H. Selecting from a base outcome identifier pool is one illustrative way of determining base outcome identifiers, and other techniques are not beyond the scope of this disclosure.

As shown in FIG. 5B, the game play UI 504 may present base outcome game pieces 594 corresponding to the set of base outcome identifiers, for example in the UI region 590G. Additionally or alternatively, the game play UI 504 may include one or more visual indications that a game piece of the array in UI region 590F corresponds to a selected identifier in the set of base outcome identifiers. As an example shown in FIG. 5B, the game piece 595, which corresponds to a selected identifier in the set of base outcome identifiers, may be a different color or pattern compared to other game pieces in the array. In this non-limiting example, the game controller has selected and presented twenty base outcome identifiers 594, as indicated in UI region 590F and UI region 590G, drawn from an exemplary base outcome pool of eighty base outcome identifiers.

If a game piece is a selected base game piece 592 and corresponds to a selected base outcome identifier, it is a matching base game piece 596. The base game play UI 504 may include one or more visual indications that a selected base game piece 592 of the array in UI region 590F is a matching base game piece 596. For example, the matching base game pieces may include a different pattern, color, shading, or other features (e.g., a border or an icon) compared to other game pieces. As an example shown in FIG.

5B, the matching base game piece 596 has a color similar to the game piece 595, but also a distinctive border and different number color to indicate that it is a matching base game piece. The UI region 590C may indicate a number of matching base game pieces ("HITS").

In various embodiments, the base outcome game pieces 594 shown in the UI region 590G may also have visual indications of whether they correspond to matching base game pieces (e.g., whether they correspond to selected base outcome identifiers). For example, base outcome game pieces 594 that correspond to matching base game pieces may include a different pattern, color, shading, or other features (e.g., a border or an icon) compared to other base outcome game pieces 594. As an example shown in FIG. 5B, the base outcome game piece 594A may have a different number color than other base outcome game pieces.

At operation 410, the game controller determines a win amount for the base game. In various embodiments, the win amount for the base game may be based on a number of matching base game pieces. The UI region 590A may include a pay table that specifies win amounts ("WIN") for particular numbers of matches ("HITS"). In this non-limiting example, two matching game pieces 596 are indicated in UI region 590F and UI region 590C, which is less than a minimum number of matches needed (e.g., four matches) to award a win amount to the user.

At operation 412, the game controller determines a number of matching trigger game pieces (i.e., a number of trigger game pieces having identifiers that match a base outcome identifier of the set of base outcome identifiers). As shown in FIG. 5B, the base game play UI 504 may include one or more visual indications that a selected trigger game piece 593 of the array in UI region 590F is a matching trigger game piece 597. For example, the matching trigger game pieces may include a different pattern, color, shading, or other features (e.g., a border or an icon) compared to other game pieces. As an example shown in FIG. 5B, the matching trigger game piece 597 has an icon similar to the trigger game pieces 593, but also a distinctive border and different background to indicate that it is a matching trigger game piece. The UI region 590D may indicate a number of matching trigger game pieces, for example with a visual indication similar to the visual indication provided on the matching trigger game piece itself.

In various embodiments, the base outcome game pieces 594 shown in the UI region 590G may also have visual indications of whether they correspond to matching trigger game pieces or not. For example, base outcome game pieces 594 that correspond to matching trigger game pieces may include a different pattern, color, shading, or other features (e.g., a border or an icon) compared to other base outcome game pieces 594. As an example shown in FIG. 5B, the base outcome game piece 594B may have a different number color and/or background color than other base outcome game pieces.

At operation 414, the game controller determines whether the number of matching trigger game pieces meets or exceeds a predetermined threshold. If the number of matching trigger game pieces meets or exceeds the predetermined threshold, the game proceeds to a bonus round, as discussed in more detail below with respect to FIGS. 6 and 7A-7D. If the number of matching trigger game pieces does not meet or exceed the predetermined threshold, the base game continues. As one example, the method may return to step 404. In some cases, the predetermined threshold is equal to the number of trigger game pieces 593 (e.g., three in the example shown in FIG. 5B), such that all trigger game pieces must be matching trigger game pieces to proceed to the bonus round, e.g., at operation 416.

As shown in FIG. 5B, the number of matching trigger game pieces 597 is one, which falls short of the threshold of three. As such, the base game will continue. In the example of FIG. 5C, the number of matching trigger game pieces 597 is three, which meets the threshold. As such, the game will proceed to a bonus round.

Figure 6:
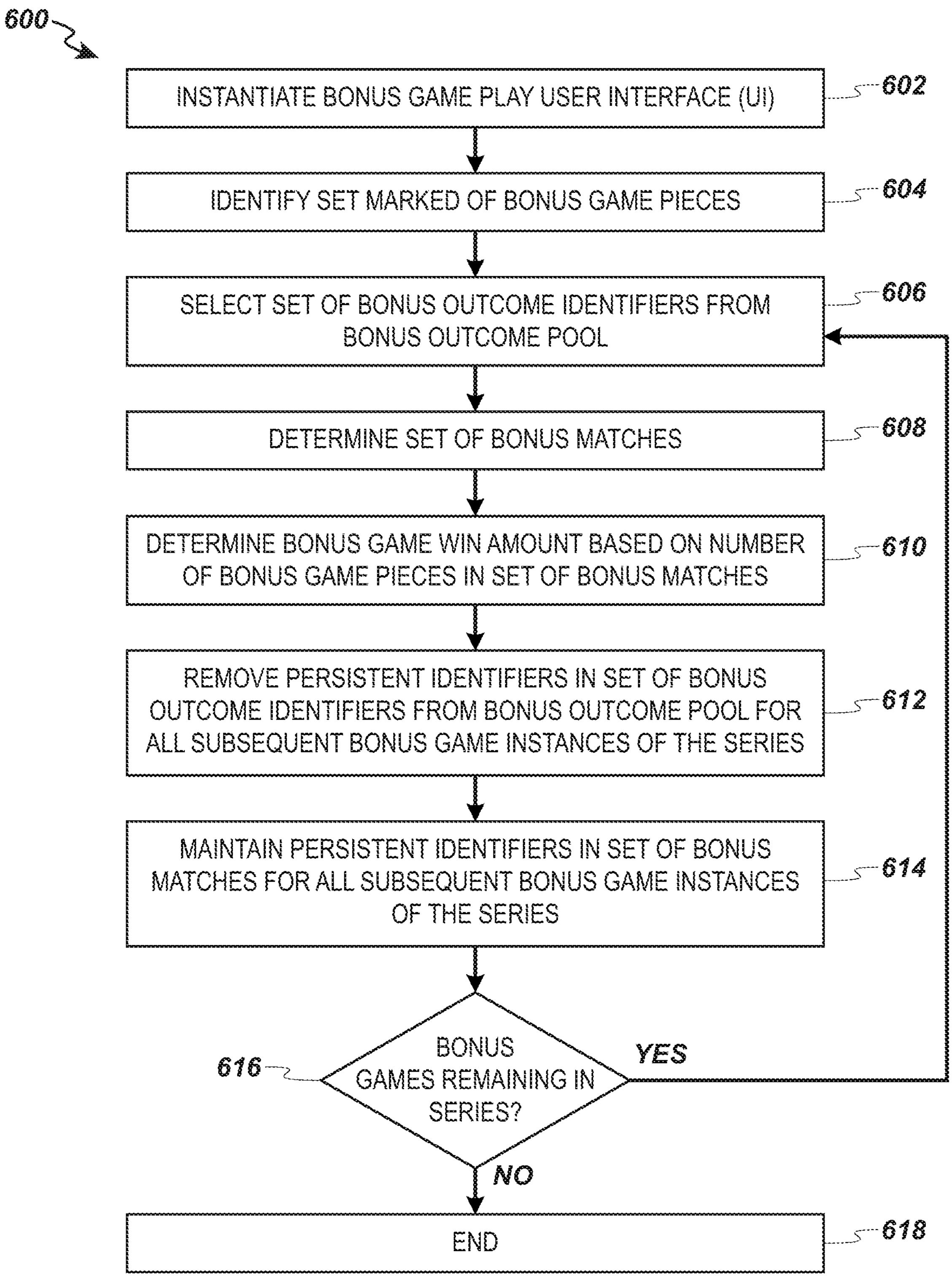
FIG. 6 is a flowchart depicting operations of an example method for implementing a bonus round of a video keno game or other game.

FIG. 6 is a flowchart depicting operations of an example method 600 for implementing a bonus round of a video keno game or other game. The bonus round may consist of a series of bonus game instances. As described in more detail below, during a bonus game instance (e.g., operations 604-616 of the example method 600), the game controller may identify a set of bonus game pieces and select a set of bonus outcome identifiers from a bonus outcome pool. A win amount may be determined based on the number of matches between the set of bonus outcome identifiers and the set of bonus game pieces. The bonus outcome identifiers may include persistent identifiers and non-persistent identifiers. Persistent identifiers may be removed from the bonus outcome pool for subsequent bonus game instances in the series. In some embodiments, the number of bonus outcome identifiers selected during each bonus game in the bonus round is constant, so removing the persistent identifiers from the bonus outcome pool increases the chances that other identifiers are selected from the bonus pool. Additionally or alternatively, the bonus game pieces corresponding to the persistent identifiers may continue to be matches for the subsequent bonus game instances in the series. This way, if a user gets a match from a persistent identifier, the match persists through each subsequent bonus game instance in the series.

The operations of the method 600 may be performed by a game controller (e.g., game controller 202) according to game processing architecture (e.g., game processing architecture 300). FIGS. 7A-7D illustrate an example bonus game play UI 708 for the bonus round of the video keno game or other game. The example bonus game play UI 708 may be provided on a display of a gaming device (e.g., gaming devices 104A-104X and 200).

Figure 7A:
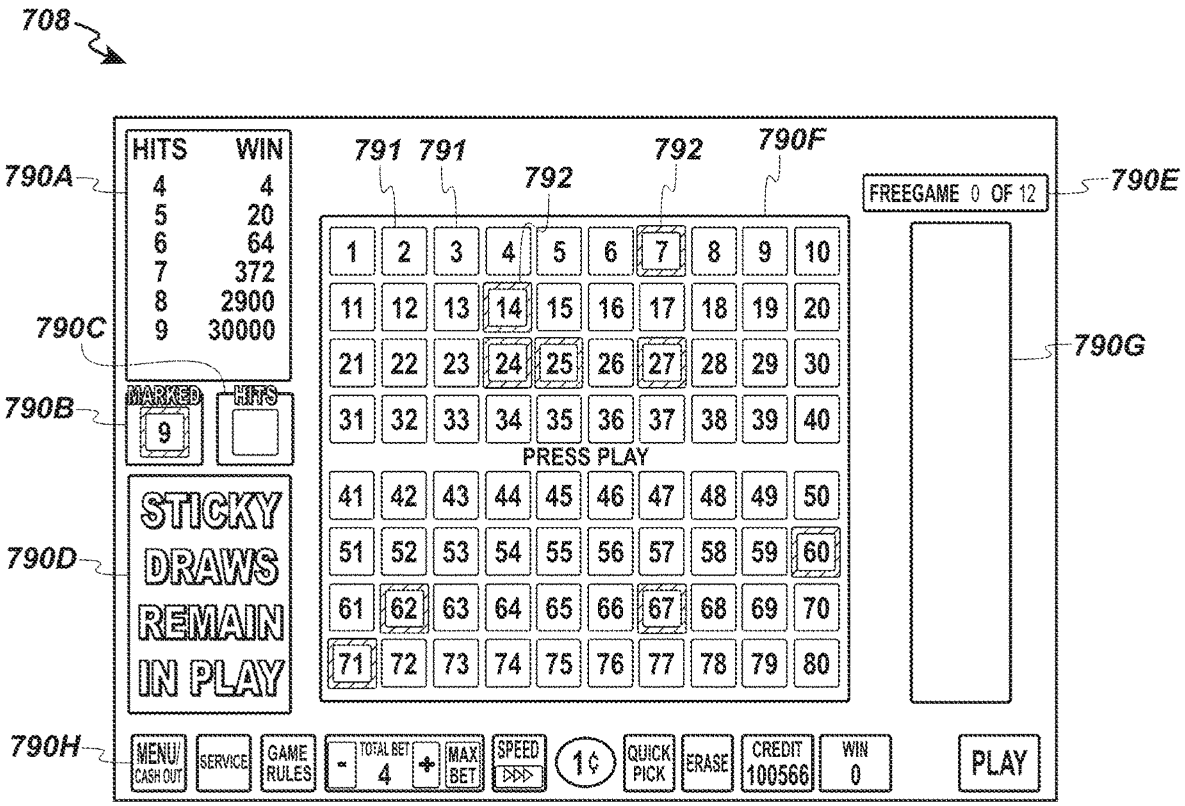
FIGS. 7A-7D illustrate an example bonus game play user interface for the bonus round of the video keno game or other game.

At operation 602, the game controller instantiates a bonus game play UI. As shown in FIG. 7A, the example bonus game play UI 708 includes UI regions 790A-H. The UI regions 790A-H may be similar to the game play UI 504 shown and described with respect to FIGS. 4-5C. The UI regions 790A-H include UI elements (e.g., bonus game play UI elements 310A-310N) to present information to a user of the game and/or receive user inputs. The UI regions 790A-H are discussed in more detail below. The UI region 790F includes an array of selectable game pieces 791, similar to the array of selectable game pieces in the UI region 590F of the game play UI 504.

Returning to FIG. 6, at operation 604, the game controller identifies a set of selected bonus game pieces. As shown in FIG. 7A, the selected bonus game pieces 792 may be game pieces 791 that are selected by user input (e.g., by a user touching or otherwise selecting the game piece). In some cases, the selected bonus game pieces 792 may be selected automatically, for example using the quick pick UI element in UI region 790H. In still other embodiments, the selected bonus game pieces 792 may be the same game pieces that were selected, e.g., by a user, during the base game prior to the bonus round. In this non-limiting example, some of the selected bonus game pieces 792 differ from the selected base game pieces 592, e.g., as indicated in FIG. 5A.

The game play UI 704 may include a visual indication that a game piece is a selected bonus game piece 792. For example, the selected bonus game pieces 792 may include a different pattern, color, shading, or other features (e.g., a border or an icon) compared to other game pieces. As an example shown in FIG. 7A, the selected bonus game pieces 792 may include a highlighted border and a different-colored number. The UI region 790B may indicate a number of selected ("marked") bonus game pieces 792. In this non-limiting example, nine selected bonus game pieces 792 are indicated in UI region 790F and UI region 790B.

Returning to FIG. 6, at operation 606, the game controller selects a set of bonus outcome identifiers from a bonus outcome pool for the current bonus game of the bonus round. The bonus outcome pool may include a set of identifiers that match the identifiers of the selectable game pieces 791. The set of bonus outcome identifiers may be determined using a random number generator, as discussed in more detail above with respect to FIG. 3. In some cases, the game controller selects the set of bonus outcome identifiers in response to a user selecting the 'PLAY' UI element of the UI region 790H. In this non-limiting example, as shown in FIG. 7B, the game controller has selected and presented twenty bonus outcome identifiers 794, as shown in UI region 790F and UI region 790G, drawn from an exemplary bonus outcome pool of eighty bonus outcome identifiers.

The bonus outcome identifiers selected from the bonus outcome pool may include persistent identifiers and non-persistent identifiers. Persistent identifiers may remain in the set of bonus outcome identifiers for each subsequent bonus game in the bonus round, while non-persistent identifiers do not remain in the set of bonus outcome identifiers beyond the current bonus game. Additionally or alternatively, persistent identifiers may be removed from the bonus outcome pool for future bonus games in the bonus round.

Figure 7B:
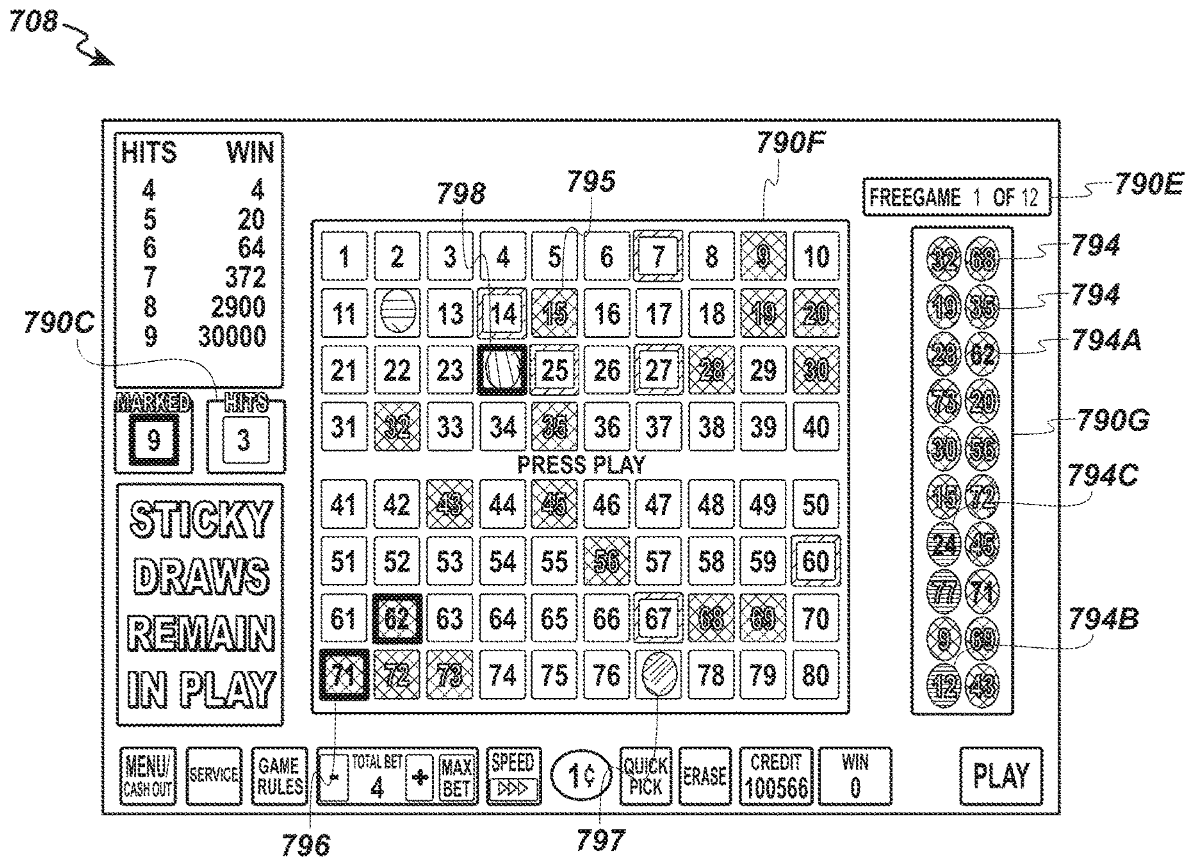

As shown in FIG. 7B, the bonus game play UI 708 may present bonus outcome game pieces 794 corresponding to the set of bonus outcome identifiers, for example in the UI region 790G. Additionally or alternatively, the bonus game play UI 708 may include one or more visual indications that a game piece of the array in UI region 790F corresponds to a selected bonus outcome identifier. As an example shown in FIG. 7B, the game piece 795, which corresponds to a selected bonus outcome identifier, may be a different color or pattern compared to other game pieces in the array.

If a game piece is a selected bonus game piece 792 and corresponds to a selected bonus outcome identifier, it is a matching bonus game piece 796. The bonus game play UI 708 may include one or more visual indications that a selected bonus game piece 792 of the array in UI region 790F is a matching bonus game piece 796. For example, the matching bonus game pieces 796 may include a different pattern, color, shading, or other features (e.g., a border or an icon) compared to other game pieces in the array. As an example shown in FIG. 7B, the matching bonus game piece 796 has a color similar to the game piece 795, but also a distinctive border and different number color to indicate that it is a matching bonus game piece. The UI region 790C may indicate a number of matching bonus game pieces ("HITS").

In various embodiments, the bonus outcome game pieces 794 shown in the UI region 790G may also have visual indications of whether they correspond to matching bonus game pieces or not. For example, bonus outcome game pieces 794 that correspond to matching bonus game pieces may include a different pattern, color, shading, or other features (e.g., a border or an icon) compared to other bonus outcome game pieces 794. As an example shown in FIG. 7B, the bonus outcome game piece 794A may have a different number color than other base outcome game pieces. In this non-limiting example, two matching bonus game pieces are indicated in UI region 790F and UI region 790G.

The bonus game play UI 708 may include one or more visual indications that a bonus outcome identifier is a persistent identifier. For example, a bonus game piece in the array in UI region 790F that corresponds to a persistent bonus outcome identifier may include a different pattern, color, shading, or other features (e.g., a border or an icon) compared to other game pieces in the array. As an example shown in FIG. 7B, the persistent bonus game piece 797 may include an icon and a different colored background compared to other bonus game pieces in the array to indicate that the bonus game piece corresponds to a persistent bonus outcome identifier. Additionally or alternatively, the bonus outcome game pieces 794 shown in the UI region 790G may also have visual indications of whether they correspond to persistent bonus outcome identifiers. As an example shown in FIG. 7B, the bonus outcome game piece 794B includes a different-colored or patterned background compared to the other bonus outcome game pieces. In this non-limiting example, one persistent bonus game piece is indicated in UI region 790F and UI region 790G.

Additionally or alternatively, the bonus game play UI 708 may include one or more visual indications that a matching bonus game piece corresponds to a persistent identifier (i.e., that the game piece is a persistent matching bonus game piece). For example, a matching bonus game piece in the array in UI region 790F that corresponds to a persistent bonus outcome identifier may include a different pattern, color, shading, or other features (e.g., a border or an icon) compared to other game pieces in the array. As an example shown in FIG. 7B, the persistent matching bonus game piece 798 may include an icon and a different colored background similar to the persistent bonus game piece 797 to indicate that the bonus game piece corresponds to a persistent bonus outcome identifier, and also may include a different colored border to indicate that the game piece is a matching bonus game piece.

Additionally or alternatively, the bonus outcome game pieces 794 shown in the UI region 790G may also have visual indications of whether they correspond to a persistent matching bonus game piece. As an example shown in FIG. 7B, the persistent bonus outcome game piece 794C includes a different-colored background compared to the other bonus outcome game pieces to indicate that it corresponds to a persistent bonus outcome identifier and a different-colored number to indicate that it corresponds to a matching bonus game piece. In this non-limiting example, one persistent matching bonus game piece is indicated in UI region 790F and UI region 790G.

At operation 608, the game controller determines a set of bonus matches. In various embodiments, the set of bonus matches may include the matching bonus game pieces from the current game of the bonus round. As noted herein, the persistent matching bonus game pieces are included in the set of bonus matches for the game in which they are selected from the bonus outcome pool and all subsequent bonus game instances in the bonus round. As such, determining the set of bonus matches may include determining persistent matching bonus game pieces from one or more previous bonus game instances in the current bonus round in addition to determining the matching bonus game pieces from the current bonus game instance. In this non-limiting example, a set of three bonus matches, comprised of two matching bonus game pieces 796 and one persistent matching bonus game piece 798, is indicated in UI region 790C ("HITS").

At operation 610, the game controller determines a bonus game win amount. In various embodiments, the win amount for the bonus game may be based on a number of bonus matches in the set of bonus matches. The UI region 790A may display the win amount and/or include a pay table that specifies win amounts ("WIN") for particular numbers of matches ("HITS"). In this non-limiting example, a set of 3 bonus matches ("HITS"), as indicated in UI region 790C, is below the minimum number of matches needed (e.g., four matches) as indicated in UI region 790A, to award a win amount to the user.

At operation 612, the game controller removes the persistent identifiers in the set of bonus outcome identifiers from the bonus outcome pool for all subsequent bonus game instances of the series. As noted above, the persistent identifiers are removed from the bonus outcome pool such that the identifier will not be selected again during the bonus round. In some embodiments, the number of bonus outcome identifiers selected during each bonus game in the bonus round is constant, e.g., 20 bonus outcome identifiers, so removing the persistent identifiers from the bonus outcome pool increases the chances that other identifiers are selected from the bonus pool.

At operation 614, the game controller maintains the persistent identifiers that are in the set of bonus matches in the set of bonus matches for all subsequent bonus game instances of the series. As noted above, the persistent matching bonus game pieces are included in the set of bonus matches for the game in which they are selected from the bonus outcome pool and all subsequent games in the bonus round.

Figure 7C:
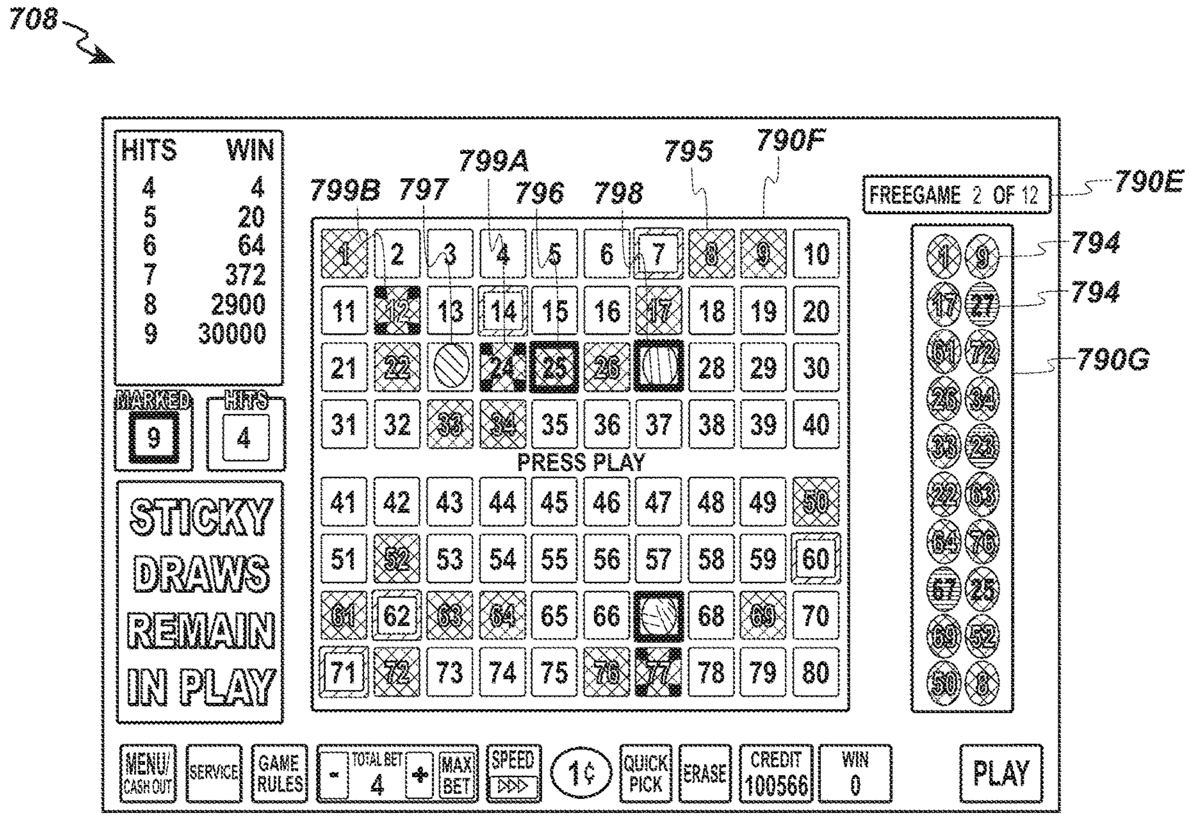

The bonus game play UI 708 may include one or more visual indications that a bonus game piece of the array in UI region 790F corresponds to a persistent identifier from a previous bonus game. As shown in FIG. 7C, during a subsequent bonus game to the bonus game shown in FIG. 7B, the persistent bonus game pieces 799A and 799B may include icons or other visual indication(s) indicating that they correspond to a persistent identifier from a previous bonus game. Since the persistent bonus game piece 799A is a persistent matching bonus game piece, it will continue to count as a match for the rest of the bonus games in the bonus round.

Returning to FIG. 6, at operation 616, the game controller determines whether there are bonus games remaining in the series of bonus games in the bonus round. The UI region 790E may indicate a number of games remaining in the bonus round. As noted above the bonus round may consist of a series of bonus games. If there are bonus games remaining in the bonus round, the bonus round may implement a subsequent bonus game, for example by returning to operation 606. If there are not bonus games remaining in the bonus round, the bonus round may end. In some cases, upon the bonus round ending, the game returns to the base game, e.g., at operation 618.

In some cases, the bonus game play UI 708 may sequentially pick and/or display the bonus outcome identifiers for bonus games. The bonus game play UI 708 may display an animation in which bonus game pieces that correspond to bonus outcome identifiers are displayed one-by-one or in groups. This may allow users to more easily see matches as they occur and to build suspense during the bonus game.

Figure 7D:
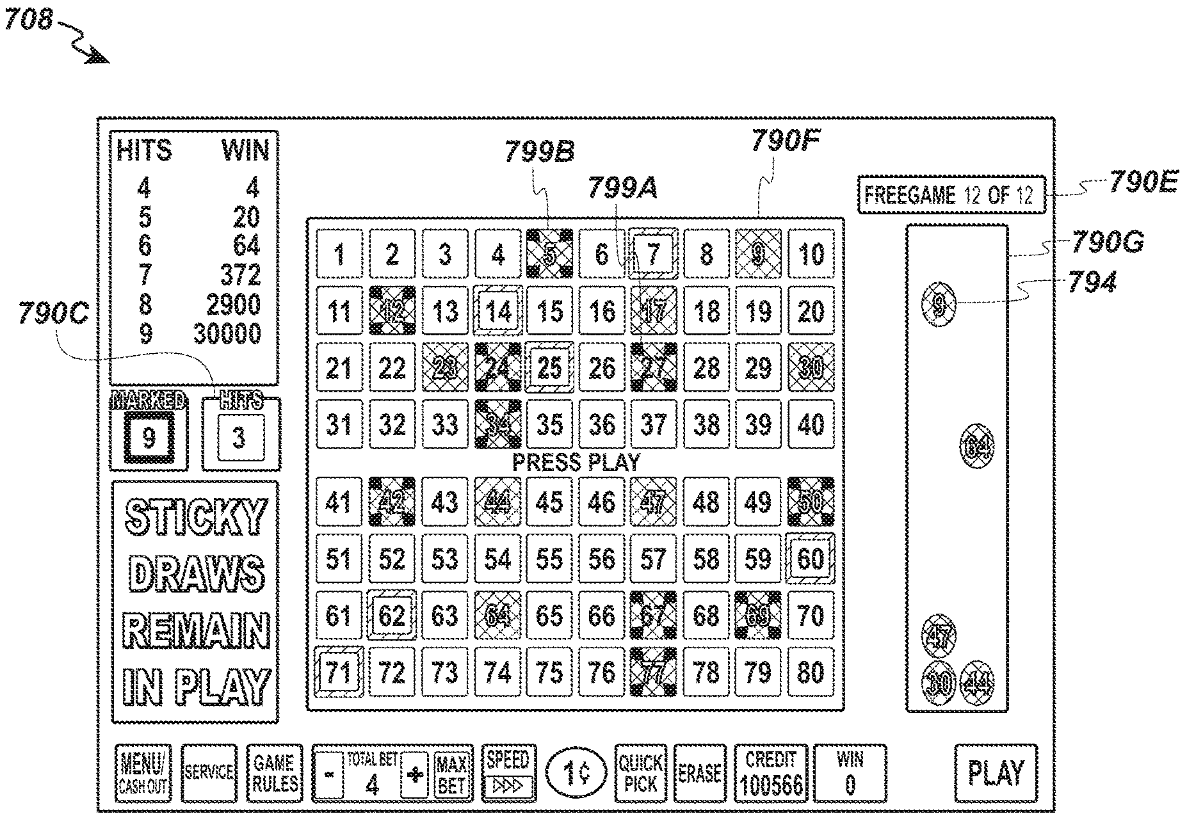

FIG. 7D illustrates the bonus game play UI 708 while bonus game pieces are sequentially being identified as corresponding to bonus outcome identifiers. As shown in FIG. 7D, five bonus game pieces have been identified (9, 64, 47, 30, and 44, shown in UI region 790G), and a number of bonus game pieces remain to be identified (e.g., fifteen bonus game pieces). As shown in FIG. 7D, during a subsequent bonus game in the bonus round (e.g., game 12 of 12), persistent bonus game pieces 799A and 799B may include icons or other visual indication(s) indicating that they correspond to a persistent identifier from a previous bonus game. Even though none of the five identified bonus game pieces shown in the UI region 790G are matches, the UI region 790C indicates three matches based on the matching persistent bonus identifiers 799A (24, 27, and 67) continuing to be matches throughout the bonus round.

This non-limited example details a technical solution of providing a keno bonus game to a user in which the probability of the user being awarded a win is increased over the course of play of instances of the bonus game in a manner in which the play of the bonus is an enjoyable experience to the player, while maintaining the RTP of the game. Further to the example outlined above, in accordance with this technical solution, during the initial bonus game instance the player has selected nine bonus game pieces from the eighty selectable bonus game pieces. In this example, twenty bonus game outcome identifiers are randomly drawn from an eighty bonus game outcome identifier pool. The probability of a user matching a set of four of the nine selected bonus game pieces with the drawn twenty bonus game outcome identifiers, (e.g., to win an award) is approximately 0.3%. During the initial bonus game instance, three persistent identifiers are drawn with two of the persistent identifiers indicating two persistent game pieces and one of the persistent identifiers matching a selected bonus game piece to indicate a persistent matching game piece. Carrying these persistent identifiers to the second instance of the bonus game, the user already has obtained one "Hit" and only requires three additional hits to be awarded a win, e.g., for a four hit set of matching game pieces, and further, the bonus game outcome pool is reduced from eighty bonus outcome identifiers, e.g., by the two persistent game pieces carried over, to seventy-eight bonus outcome identifiers. This improves the probability of the user matching a set of four of the nine selected game bonus game pieces to approximately 1.55%, as the user now needs only to match three of the remaining eight unmatched selected game pieces, with a draw of twenty bonus game outcome identifiers from a seventy-seven bonus game outcome identifier pool. Continuing this non-limiting example, in a successive instance of the bonus game where, e.g., eight persistent identifiers have been carried forward with two persistent matched game pieces, the probability of the user obtaining two additional hits to be awarded a win improves to approximately 7.5%. It can be recognized that continuing to draw additional persistent bonus outcome identifiers, e.g., in successive instances of the bonus game, will continue to improve the probability that the user will match the number of bonus game pieces needed to be awarded a win.

In this non-limiting example, to provide an enjoyable experience to the player whilst maintaining the RTP of the game, the game controller is configured with a weighted probability of drawing a persistent bonus game outcome identifier during the draw of the twenty bonus game outcome identifiers in an instance of the bonus game, such that an average number of persistent bonus game outcome identifiers are drawn over the course of play of the instances of the bonus game. As an example, the game controller may be configured to draw, on average, ten persistent bonus game outcome identifiers over the course of, e.g., twelve instances of play of the bonus game. Further to this, the game controller may be configured to use a look-up table to determine, based on the number of persistent identifiers already drawn, the probability of drawing a persistent outcome identifier in each draw of a bonus game outcome identifier during an instance of the bonus game. As a non-limiting example, in a draw of a bonus game outcome identifier where no persistent identifiers have been drawn the game controller, referencing the lookup-table, may determine the probability of drawing a persistent identifier to be, e.g., 50%. Following, in a successive draw of a bonus game outcome identifier where eight persistent identifiers have already been drawn, the game controller, referencing the lookup-table, may determine the probability of drawing a persistent identifier to be, e.g., 4%. Using this weighting the game controller may be configured to maintain, e.g., a minimum draw of six persistent bonus game outcome identifiers and maximum draw of fifteen persistent bonus game outcome identifiers, with an average draw, e.g., of ten persistent bonus game outcome identifiers over the course of play of a bonus game.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A method, the method comprising:

instantiating a game play user interface that depicts game pieces on a display for a number of game instances;

retrieving a set of outcome identifiers from an outcome pool, the set of outcome identifiers comprising one or more persistent identifiers and one or more non-persistent identifiers, the retrieving weighting retrieval of the one or more persistent identifiers based on a total number of the one or more persistent identifiers retrieved in order to maintain a target return to player;

generating a set of matches comprising the game pieces that are associated with identifiers that match an outcome identifier of the set of outcome identifiers; and causing display of a win amount on the game play user interface based on a number of the game pieces in the set of matches; wherein each game piece in the set of matches that corresponds to a persistent identifier of the set of outcome identifiers is maintained in the set of matches for a subsequent game instance of the number of game instances.

2. The method of claim 1, further comprising providing a visual indication on the game play user interface for each game piece in the set of matches.

3. The method of claim 1, further comprising providing a visual indication for each persistent identifier.

4. The method of claim 3, wherein the visual indication includes a pattern.

5. The method of claim 3, wherein the visual indication includes a color.

6. The method of claim 3, wherein the visual indication includes a border or icon.

7. The method of claim 1, wherein retrieving the set of outcome identifiers is performed by a server that provides an outcome to an electronic device that includes the display.

8. The method of claim 1, wherein the method is performed by an electronic device that includes the display.

9. A system, comprising:

a non-transitory storage medium storing instructions; and a controller configured to execute the instructions to:

instantiate a game play user interface depicting game pieces on a display for a number of game instances;

retrieve one or more persistent numbers and one or non-persistent numbers from an outcome pool, the retrieving weighting retrieval of the one or more persistent numbers based on a total number of the one or more persistent numbers retrieved in order to maintain a target return to player;

generating a set of matches comprising the game pieces that are associated with numbers that match one or more of the one or more persistent numbers or the one or non-persistent numbers; and causing display of a win amount on the game play user interface based on a number of the game pieces in the set of matches; wherein each game piece in the set of matches that corresponds to a persistent number of the one or more persistent numbers is maintained in the set of matches for a subsequent game instance of the number of game instances.

10. The system of claim 9, wherein the one or more persistent numbers and the one or more non-persistent numbers have an equal number of numbers for the subsequent game instance.

11. The system of claim 9, wherein the game play user interface displays:

the number of game pieces in the set of matches; and the win amount.

12. The system of claim 9, wherein the controller further executes the instructions to at least one of:

identify the one or more of the one or more persistent numbers and the one or non-persistent numbers; or retrieve the one or more persistent numbers and the one or more non-persistent numbers in response to at least one user input.

13. The system of claim 9, wherein each persistent number is removed from the outcome pool for the subsequent game instance.

14. The system of claim 9, wherein the game play user interface comprises a user interface region that includes game outcome pieces corresponding to the one or more persistent numbers and the one or more non-persistent numbers.

15. The system of claim 9, wherein:

the display is a component of an electronic device; and the controller is a component of a server that communicates the one or more persistent numbers and the one or more non-persistent numbers to the electronic device.

16. The system of claim 9, wherein:

the display is a component of an electronic device; and the controller is a component of a server that communicates an outcome to the electronic device.

17. The system of claim 16, wherein the electronic device comprises a mobile device.

18. A computer program product stored in a non-transitory computer readable medium including:

first instructions executable by at least one processor to instantiate a game play user interface that depicts game pieces on a display for a number of game instances;

second instructions executable by the at least one processor to retrieve a set of outcome identifiers from an outcome pool, the set of outcome identifiers comprising one or more persistent identifiers and one or more non-persistent identifiers, the retrieving weighting retrieval of the one or more persistent identifiers based on a total number of the one or more persistent identifiers retrieved in order to maintain a target return to player;

third instructions executable by the at least one processor to generate a set of matches comprising the game pieces that are associated with identifiers that match an outcome identifier of the set of outcome identifiers; and fourth instructions executable by the at least one processor to cause display of a win amount on the game play user interface based on a number of the game pieces in the set of matches; wherein each game piece in the set of matches that corresponds to a persistent identifier of the set of outcome identifiers is maintained in the set of matches for a subsequent game instance of the number of game instances.

19. The computer program product of claim 18, further comprising fifth instructions executable by the at least one processor to provide a visual indication on the game play user interface for each game piece in the set of matches.

20. The computer program product of claim 18, wherein the fourth instructions are executable by the at least one processor to cause display of the win amount on the game player user interface by transmitting a message to an electronic device that includes the display.

* * * * *